(No Model.)

L. BELL.
COIL FOR DYNAMO ELECTRIC MACHINES.

No. 516,797. Patented Mar. 20, 1894.

WITNESSES
A. Orne
N. L. Hayes.

INVENTOR
Louis Bell,
By Bentley & Blodgett
Attys.

UNITED STATES PATENT OFFICE.

LOUIS BELL, OF BOSTON, MASSACHUSETTS, ASSIGNOR TO THE GENERAL ELECTRIC COMPANY, OF SAME PLACE.

COIL FOR DYNAMO-ELECTRIC MACHINES.

SPECIFICATION forming part of Letters Patent No. 516,797, dated March 20, 1894.

Application filed November 13, 1893. Serial No. 490,761. (No model.)

*To all whom it may concern:*

Be it known that I, LOUIS BELL, a citizen of the United States, residing in Boston, county of Suffolk and State of Massachusetts, have invented a new and useful Improvement in Coils for Dynamo-Electric Machines, of which the following is a specification.

My invention relates to dynamo electric machinery and consists in a certain new and useful improvement in coils or windings for dynamo electric machines, and the method of applying such coils to the inductive members of such a machine. Such inductive members, as usually constructed, consist of layers of laminæ separated from each other by thin sheets of insulating material, and the edges of said plates or laminæ are usually of such shape as to form, when assembled, what is known as a notched or toothed core, and the notches between the teeth are usually undercut, that is to say, smaller at the opening than below, so as to form recesses for the retention of the coils or windings. It is a matter of practical importance in constructing such machines to wind the coils separately and afterward apply them to the members of which they are to form a part, instead of winding them directly upon the core. It is obvious, however, that if the grooves or spaces between the teeth of the cores of said members are undercut, the coil which is to be inserted, if it be of the ordinary construction, must be small enough to go through the narrow opening between the faces of the teeth. If such is the case, however, the coil after it is in position will be loose in the groove between the teeth, and a space of considerable size will have to be filled with insulating material in order to secure the coil in its position.

The object of my invention is to construct a coil which can be inserted through the narrow opening between the teeth of such a core, and yet be of such size that when it is in place it will substantially fill the larger space below said opening, so that a single small wedge adapted to close the said opening will hold it firmly in place.

My invention also applies to the method of so constructing and inserting the coils.

Figure 1:
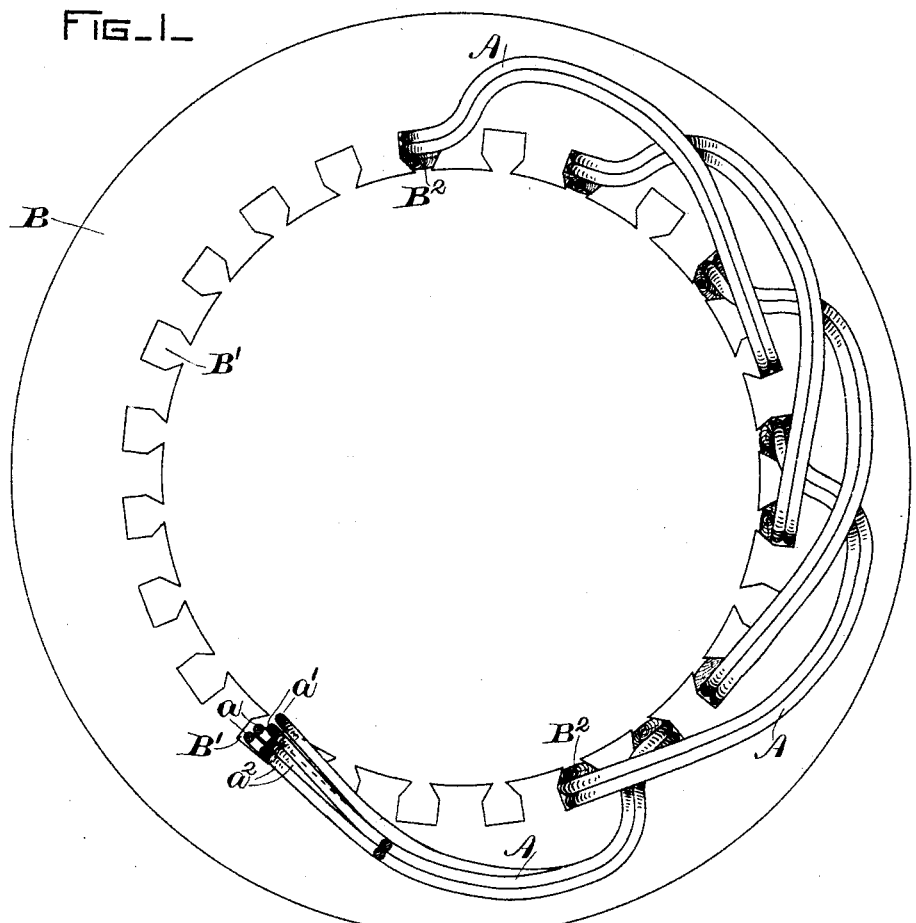
Figure 2:
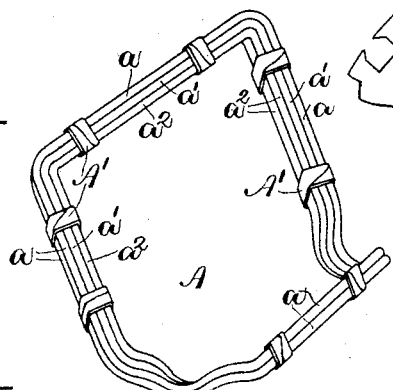
Figure 3:
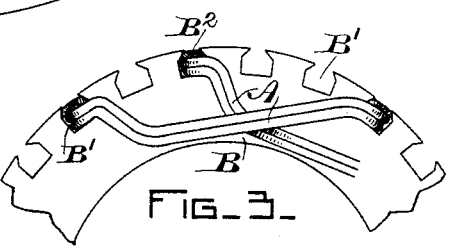

Referring to the accompanying drawings, Figure 1 is an end elevation of the outer member, or field, of a dynamo electric machine with a number of coils in place. Fig. 2 is a perspective view of one of the coils. Fig. 3 is an end view of a portion of an inner member or armature with one or two coils in position.

Referring to Fig. 2, the coil A is made up of strands of insulated wire wound preferably upon a form of such shape as will best accommodate the core of the member, either field or armature, to which it is to be applied. As best shown in Fig. 1 the said coil is wound over and over upon itself in three layers $a$, $a'$, $a^2$. After the coil is wound the different strands may for convenience be tied or bound together by temporary binders of tape or cord A', although this is, of course, not essential. The completed coil is then applied to the core B in the following manner: One end of the coil is placed opposite that opening between two teeth of the core into which said coil is to be inserted, and the cords A', if such cords are used, at that end of the coil are removed. One of the outer strands or layers of strands, is then inserted into the groove and slipped to one side so as to fit under the undercut portion thereof. After this layer is in place the outer layer at the opposite side of the coil is also inserted and pushed in the opposite direction until it lies under the undercut portion at the other side of the groove. As the completed coil is of such size as to substantially fill the groove or space between the teeth, when it is in place, there is obviously room between the two outer layers for the insertion of the middle layer, thus completing the insertion of the coil so that it lies entirely within the groove. When one end of the coil has thus been put in place the same process is gone through with the other end, there being, of course, sufficient elasticity in the coil to accommodate such distortion thereof during the operation as may be necessary. This is clearly illustrated in Fig. 1, where the layers $a$ and $a^2$ are already in place in the groove B', and the layer $a'$ is in the groove opening ready to be inserted between the other two.

In the drawings I have shown the coils of such size and shape as to conform to the square portion of the groove, leaving the upper undercut portion empty. Into this upper portion, after the coils are in place, a wedge B² of non-conducting and non-magnetic material, preferably wood, is driven, thus closing the opening and holding the coils firmly in place. While the grooves in this instance are shown as square such shape is not, of course, essential, as any shape in which the main portion of the groove is larger than the opening between the faces of the teeth would answer the purpose, since the object of such a formation is to make the breaks in the magnetic circuit as small as possible, and to facilitate the fastening of the coils in place.

Should it be desired to repair the armature by replacing a coil or coils it can be easily done by taking out one or more of the wooden wedges, removing the coils in the same way in which they were inserted, and replacing them by new ones.

The coils herein shown are applicable to either or both of the inductive members of a dynamo electric machine, and it is not essential to the invention that they should be of any particular size or shape, the size in cross section being determined by the amount of space between the teeth, while the length and shape of the coil depend upon the nature of the completed winding and the manner of overlapping the coils.

The peculiar shape given to the coil used to illustrate my invention is especially adapted for use with inductive motors, but coils such as herein described can be applied to a toothed core of any description, and can be secured after it is thus applied by any suitable means, not necessarily limited to a plug or wedge, since it is only essential that the opening through which the coil is inserted be closed to prevent the accidental displacement of said coil.

What I claim as new, and desire to secure by Letters Patent, is—

1. The combination with an inductive core having undercut grooves or coil chambers, of a separately constructed coil or winding, consisting of a number of turns of wire, so wound that the cross section of said coil when completed is substantially the same as that of the said coil chambers, but larger than the contracted openings, or mouths thereof, as set forth.

2. The combination with an inductive core having undercut grooves in its surface, of a winding, consisting of a coil of insulated wire wound in layers, which can be severally inserted through the mouths or openings of said undercut grooves, said coil being of a size in cross section which will substantially fill said grooves after all of said layers are inserted, and insulating non-magnetic material adapted to close the said grooves after the coils are inserted, as set forth.

3. The combination with a core having teeth with overhanging or spreading surfaces, of a coil or winding adapted to surround the said teeth, and of such size in cross section as to fill the spaces therebetween, said coil consisting of a number of strands, or layers of strands capable of insertion severally through the opening between the faces of adjacent teeth into the said spaces therebetween, as set forth.

4. The combination with an inductive core having teeth with spreading surfaces, of a winding therefor consisting of insulated wire wound or coiled upon itself, so as to form a number of adjacent layers of superposed strands, which layers can be severally inserted through the narrow opening between said spreading surfaces, but which collectively form a coil of a size and shape in cross section which substantially conforms to the main portion of the space between said teeth, as set forth.

5. The method of forming and applying the coils of a dynamo electric machine having a toothed inductive core, which consists in separately winding such a coil of a number of turns of wire, and fitting said coil in place between the teeth of said core by separating the strands or turns of the coil, and passing them singly or in groups through the openings between the teeth instead of all at once, as set forth.

6. The method of forming coils and applying the same to a toothed or notched inductive core, which consists in winding or coiling a wire into the form desired, the strands of the coil thus formed collectively being of such a size in cross section as to substantially fill the space between adjacent teeth of said core, then separating said strands, and consecutively inserting them through the small opening between the surfaces of the teeth, again collecting them into their original form in the space between said teeth and finally inserting insulating material over said coil to close the said opening and retain the coil in place, as set forth.

In witness whereof I have hereunto set my my hand.

LOUIS BELL.

Witnesses:
H. J. LIVERMORE,
A. O. ORNE.